(12) United States Patent
Kim

(10) Patent No.: US 12,174,364 B2
(45) Date of Patent: Dec. 24, 2024

(54) OBSERVATION APPARATUS CAPABLE OF OMNIDIRECTIONAL OBSERVATION WITHOUT BLIND ZONE

(71) Applicant: SL LAB, INC., Seoul (KR)

(72) Inventor: Jeong Hyun Kim, Guri-si (KR)

(73) Assignee: SL LAB, INC., Seoul (KR)

( * ) Notice: Subject to any disclaimer, the term of this patent is extended or adjusted under 35 U.S.C. 154(b) by 480 days.

(21) Appl. No.: 17/636,088

(22) PCT Filed: Aug. 19, 2020

(86) PCT No.: PCT/KR2020/010854
§ 371 (c)(1),
(2) Date: Feb. 17, 2022

(87) PCT Pub. No.: WO2021/034035
PCT Pub. Date: Feb. 25, 2021

(65) Prior Publication Data
US 2022/0291499 A1  Sep. 15, 2022

(30) Foreign Application Priority Data
Aug. 21, 2019  (KR) .................. 10-2019-0102560

(51) Int. Cl.
*G02B 23/16* (2006.01)
(52) U.S. Cl.
CPC .................................. *G02B 23/16* (2013.01)
(58) Field of Classification Search
CPC ...... G02B 23/16; G02B 23/165; G02B 23/00; G02B 23/20; G01S 7/481
See application file for complete search history.

(56) References Cited

U.S. PATENT DOCUMENTS

| | | | | |
|---|---|---|---|---|
| 3,893,746 A | * | 7/1975 | McMahon | G01S 3/7867 359/430 |
| 5,537,250 A | * | 7/1996 | Masunaga | G02B 23/00 359/399 |

(Continued)

FOREIGN PATENT DOCUMENTS

| | | |
|---|---|---|
| JP | 10-114534 | 5/1998 |
| JP | 2006-039191 | 2/2006 |

(Continued)

OTHER PUBLICATIONS

Machine translation of JP 2017134296 A (Year: 2017).*

(Continued)

*Primary Examiner* — Darryl J Collins
*Assistant Examiner* — Matthew Y Lee
(74) *Attorney, Agent, or Firm* — Bridgeway IP Law Group, PLLC; Jihun Kim

(57) ABSTRACT

Disclosed is an observation device for measuring an observation object while tracking the observation object by rotating an observation unit (10), wherein the observation device comprises a rotary unit (40) which includes: one end coupled to a support unit (20) through a first shaft rotating part (30) having a rotary shaft perpendicular to the side surface of the support unit (20); and the other end coupled to the observation unit (10) through a second shaft rotating part (50) having a rotary shaft perpendicular to the rotary shaft of the first shaft rotating part (30). Therefore, the observation device neither has a blind zone difficult to be observed nor requires rapid rotation of the rotary shaft, and thus can continuously observe objects ranging from a low-speed observation object, such as a celestial body or a planet, to a high-speed observation object, such as a satellite or a rocket.

2 Claims, 5 Drawing Sheets

(56) References Cited

U.S. PATENT DOCUMENTS

| | | | |
|---|---|---|---|
| 10,650,649 B2 | 5/2020 | Mysell | |
| 2003/0058531 A1* | 3/2003 | Baun | G02B 23/16 359/399 |
| 2012/0019642 A1* | 1/2012 | Hillis | G02B 23/2453 359/429 |
| 2013/0233996 A1* | 9/2013 | Taylor | F16M 11/18 248/550 |
| 2013/0258459 A1* | 10/2013 | Mao | G02B 23/165 359/399 |

FOREIGN PATENT DOCUMENTS

| | | | |
|---|---|---|---|
| JP | 2017-134296 | | 8/2017 |
| JP | 2017134296 A | * | 8/2017 |
| JP | 6533954 | | 6/2019 |
| KR | 10-1069258 | | 10/2011 |
| KR | 10-1513199 | | 4/2015 |
| KR | 10-1513200 | | 4/2015 |
| KR | 10-2085594 | | 3/2020 |

OTHER PUBLICATIONS

International Search Report dated Nov. 13, 2020, in International Patent Application No. PCT/KR2020/010854. Written Opinion of the International Searching Authority dated Nov. 13, 2020, in International Patent Application No. PCT/KR2020/010854.

75 years of optics. Edmund Optics, Inc. [online], 2016 [Retrieved on Nov. 3, 2020]. Retrieved from <https://www.edmundoptics.com/contact-support/catalogs/>, pp. 259 and 262.

Notification of Reason for Refusal dated Oct. 16, 2019, in Korean Application No. 10-2019-0102560.

Grant of Patent dated Feb. 26, 2020, in Korean Application No. 10-2019-0102560.

* cited by examiner

[FIG. 1]
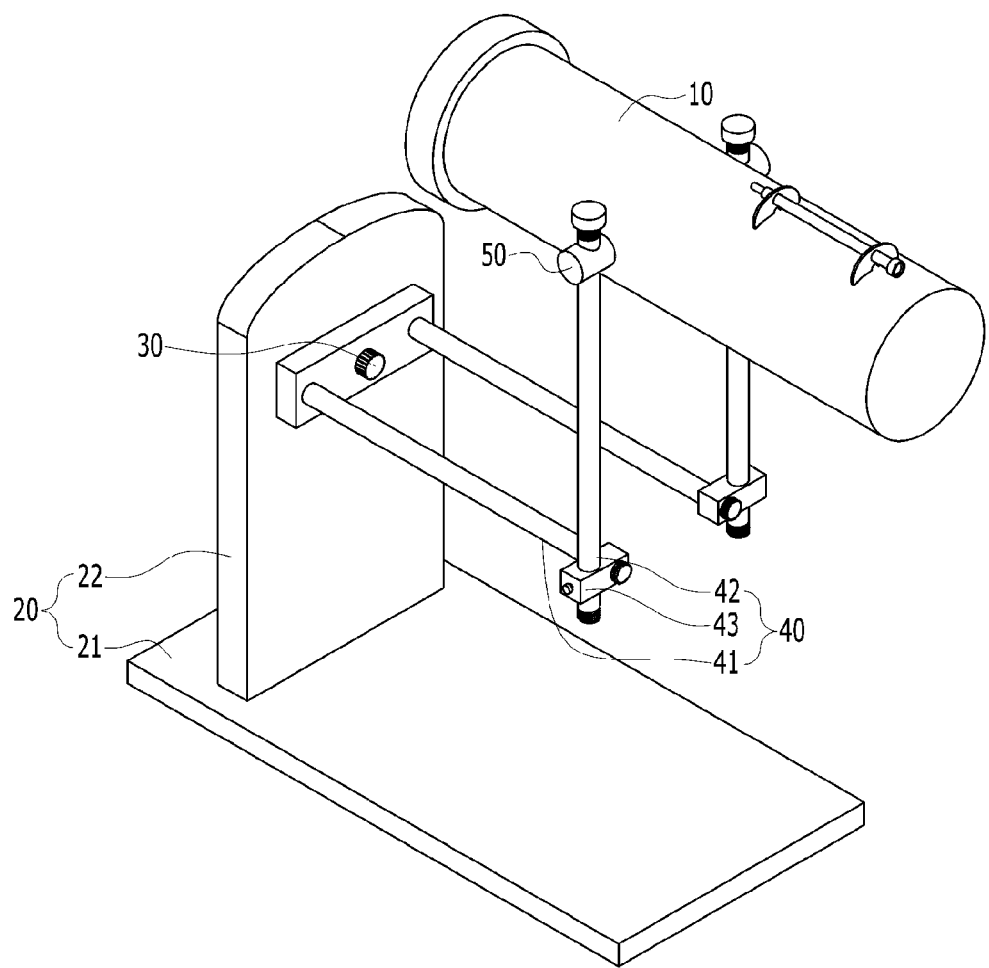

[FIG. 2]
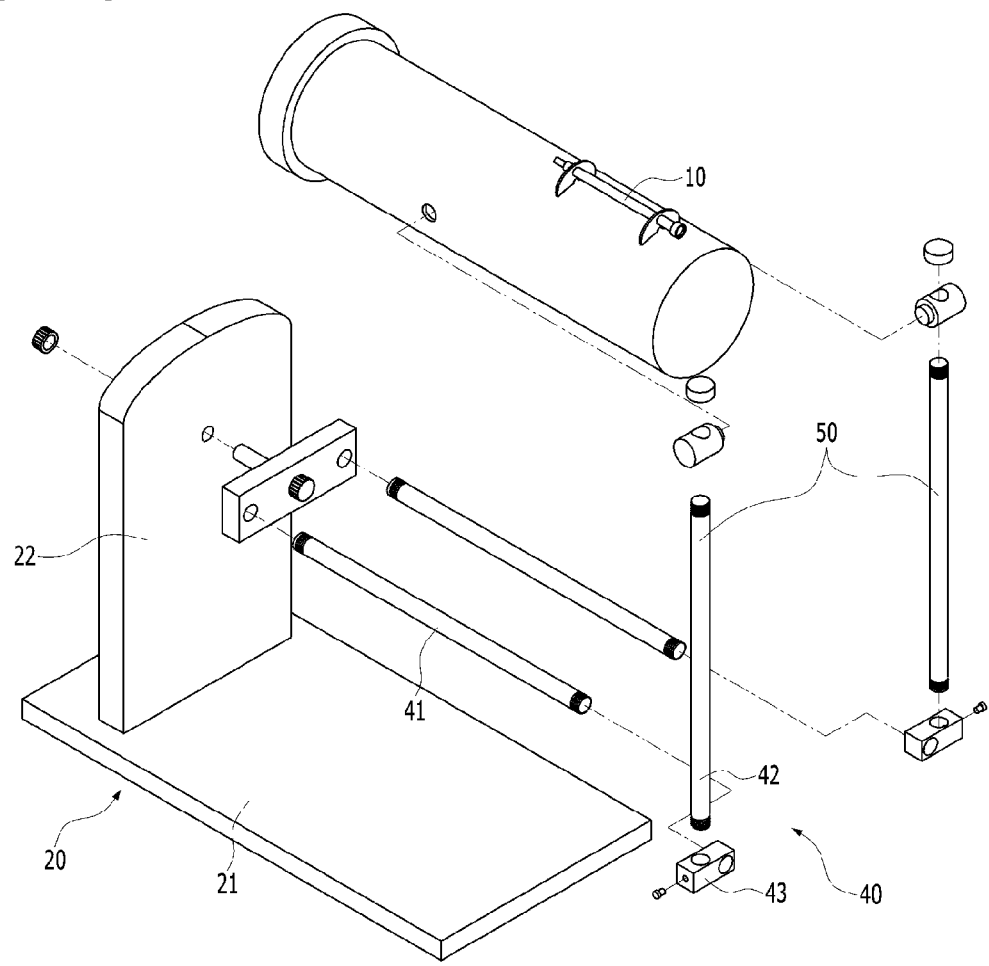

[FIG. 3]
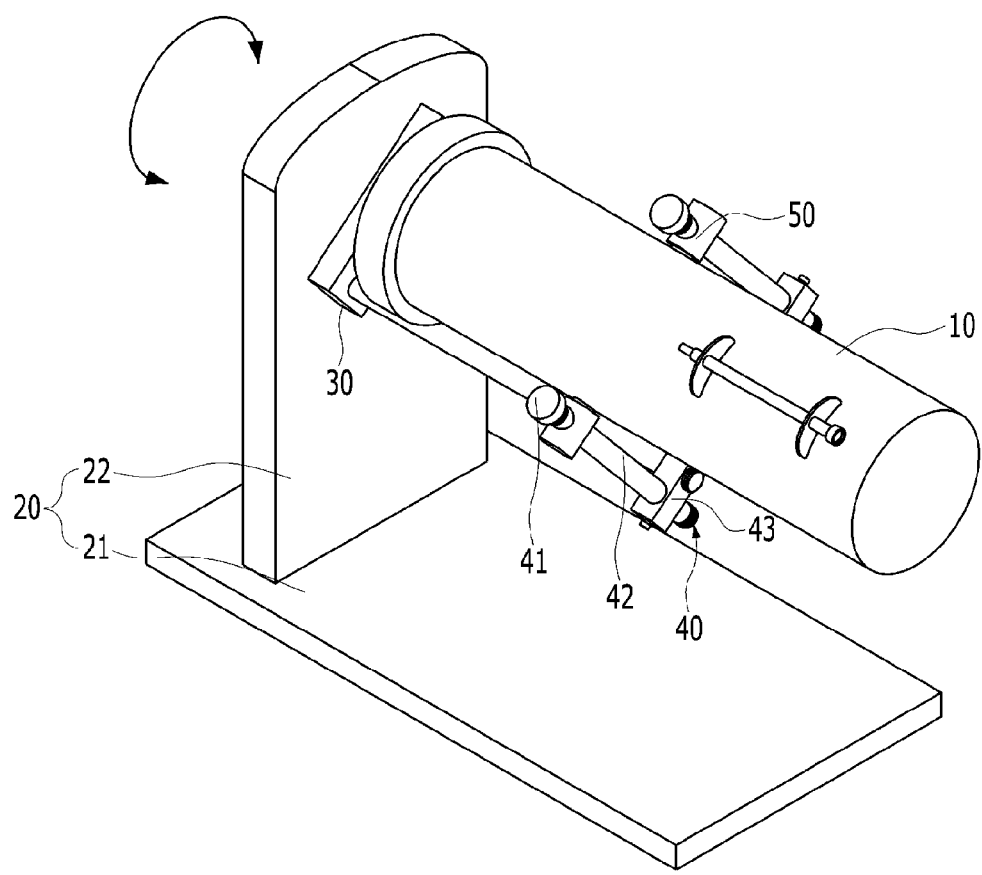

[FIG. 4]
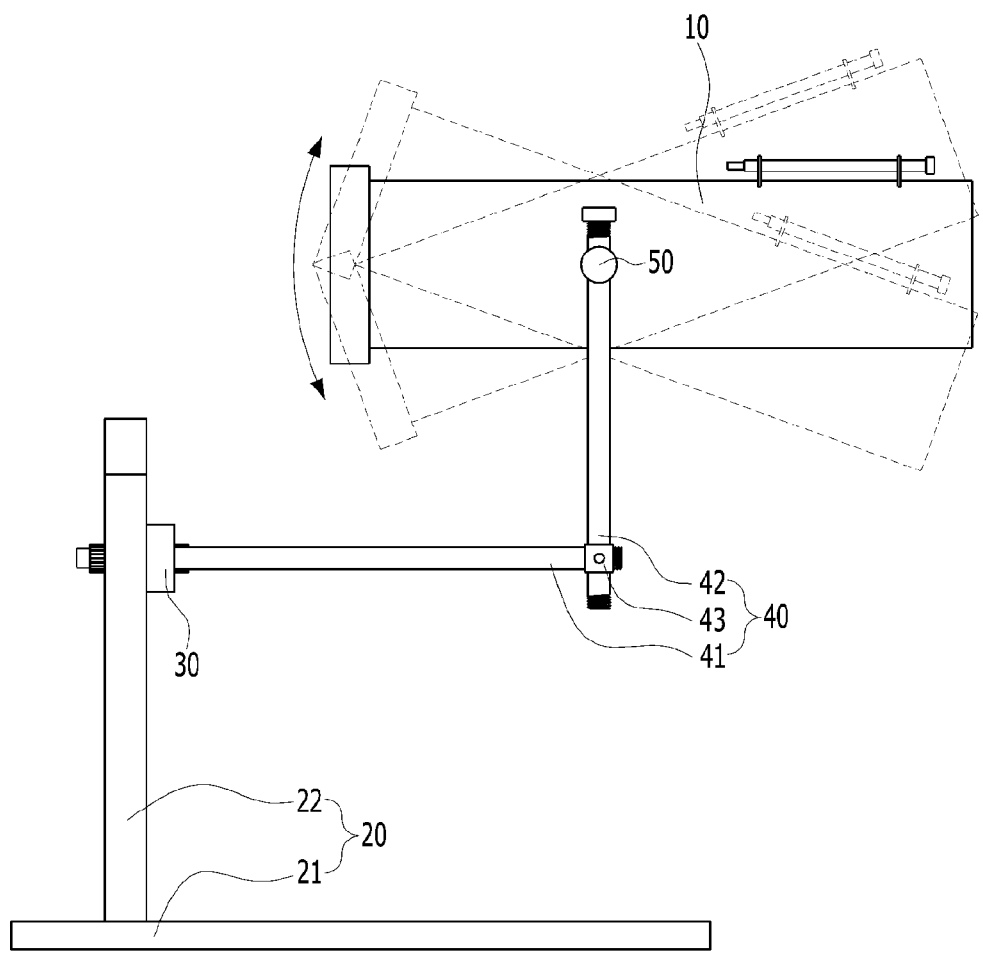

[FIG. 5]
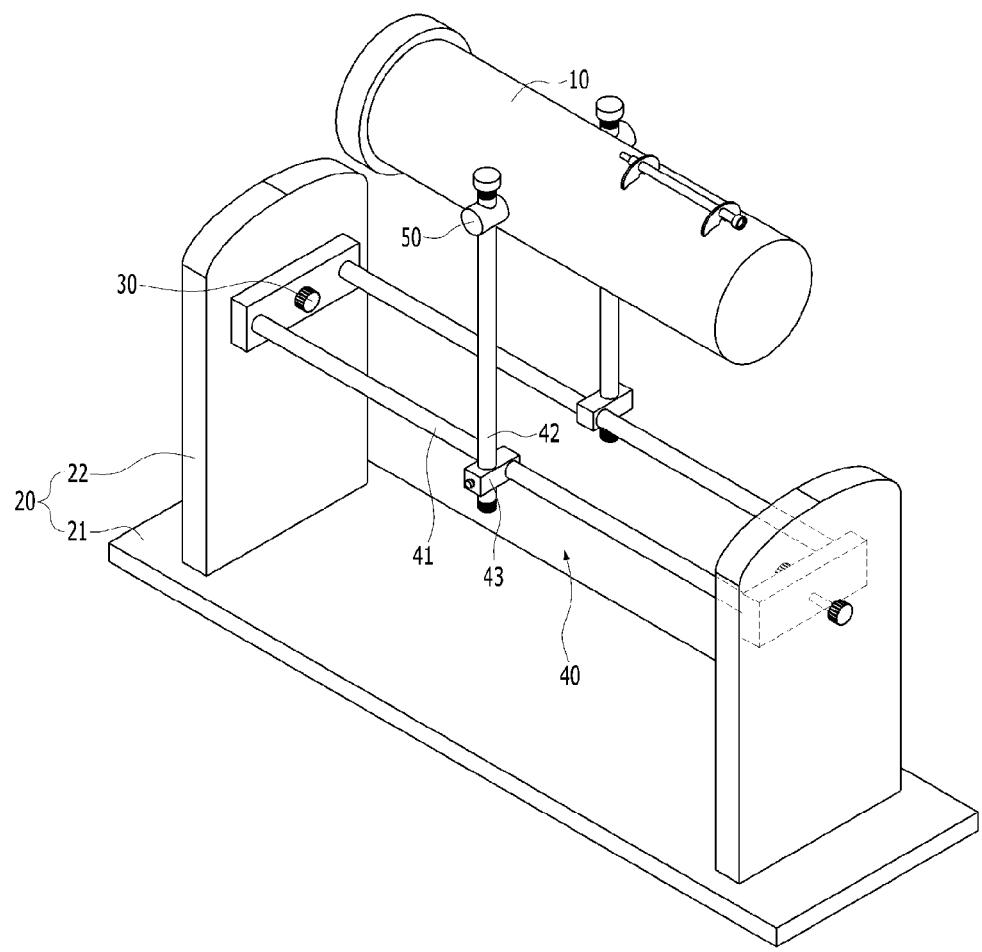

OBSERVATION APPARATUS CAPABLE OF OMNIDIRECTIONAL OBSERVATION WITHOUT BLIND ZONE

TECHNICAL FIELD

The present invention relates to an observation apparatus for observing an object moving in the sky or space such as an airplane, a drone, a rocket, a meteorite, an artificial satellite, or a planet.

DESCRIPTION OF THE RELATED ART

The celestial sphere is a considerably large virtual sphere set around an observer, and is a concept widely used in astronomy for the convenience of observation. Most of the celestial bodies, such as stars and galaxies, are so far away from the Earth that they appear to be fixed on the celestial sphere to the observer. In view of the rotation of the Earth, most of the celestial bodies appear to the observer to move at the rotation speed of the Earth. However, among the celestial objects, space objects relatively close to the Earth, e.g., planets such as Mercury, Venus, Mars, Jupiter and Saturn, comets, and satellites, are observed as if they are moving at a speed different from the rotation speed of the Earth and have been treated as unique objects since ancient times.

In modem times, objects crossing the atmosphere in the orbit of the Earth, such as hazardous space objects, artificial satellites, and rockets, or objects flying in the atmosphere, such as airplanes and cruise missiles, have orbits and speeds completely different from those of the celestial bodies, separate tracking observation apparatuses are required. In addition, since it is difficult to detect small low-altitude flying objects such as drones by using radar, the need for a new monitoring method is increasing.

In general, a telescope for observing a celestial space object performs tracking observation while a mount supporting the telescope is slowly rotating at the rotation speed of the Earth. Such mounts are classified into an equatorial mount type and an altazimuth mount type according to the type thereof. An equatorial mount is arranged toward the axis connecting the north and south poles of the celestial sphere so that the main rotation axis is parallel to the rotation axis of the Earth. When the main rotation axis is rotated at the rotation speed of the Earth, it is possible to track a celestial body in diurnal motion, so that the equatorial mount has the advantage of observing a distant celestial object from the Earth for a long time. The prior art literature, i.e., Korean Patent No. 10-1513199 entitled "Height Adjusting Device of Equatorial Mount for Astronomical Telescope" and Korean Patent No. 10-1513200 entitled "Worm Wheel Shaft Fixing Device of Equatorial Mount for Astronomical Telescope" disclose equatorial mounts. These conventional equatorial mounts have a limitation in that it is difficult to observe because as an observation target approaches the north or south pole of the celestial sphere toward which the main rotation axis is oriented, the actual angle at which the mount needs to be rotated increases compared to the angular distance on the celestial sphere.

An altazimuth mount has a structure that sets the observation direction of a telescope by using an azimuth rotating on a rotation axis perpendicular to the ground and an elevation angle between 0 and 90 degrees from the ground to the zenith, so that it has the advantage of being mechanically simple and intuitive. Such an altazimuth mount is also applied to a large astronomical telescope installed in a research facility such as an astronomical observatory, and also tracks and observes a celestial body under the control of a computer. The prior art literature, i.e., Korean Patent No. 10-1069258 entitled "Mechanical Stopper Device of Altazimuth Mount for Large-Diameter Optical Telescope" discloses an altazimuth mount. This conventional altazimuth mount also have a limitation in that it is difficult to observe because as an observation target approaches the north or south pole of the celestial sphere toward which the main rotation axis (the azimuth axis) is oriented, the actual angle at which the mount needs to be rotated increases compared to the angular distance on the celestial sphere.

In summary, in both the conventional equatorial and altazimuth mounts, when an object passing through the pole area of the celestial sphere or an area near the zenith (hereinafter collectively referred to as a "blind zone"), toward which the main rotation axis is oriented, is observed, there may be a situation in which one axis of the mount needs to be rotated rapidly up to 180 degrees or more in an instant. Accordingly, it is impossible to continuously track fast flying objects such as a satellite and a missile having such an orbit. Therefore, there is a problem in that such an object is missed in the observational field of view.

Therefore, it can be seen that in order to observe all targets ranging from low-speed observation targets that appear to be fixed on the celestial sphere such as stars, galaxies, and planets to high-speed observation targets such as artificial satellites, rockets, and drones that have an orbit completely different from the rotation of the celestial sphere, a new type of mount structure, rather than the existing equatorial and altazimuth mounts, is required. The inventor of the present invention has completed the present invention by studying a new type of mount for a long time in order to overcome the problem of the prior art and meet the above necessity.

DETAILED SUMMARY OF THE INVENTION

Technical Problem

The present invention has been conceived to overcome the above-described problems, and an object of the present invention is to provide an observation apparatus capable of continuously tracking all observation targets ranging from low-speed observation targets, such as celestial bodies and planets, and high-speed observation targets, such as artificial satellites and rockets because two rotation axes that rotate an observation unit do not intersect each other at different heights, so that there is not a blind zone, i.e., a section requiring the sharp rotation of a mount, unlike in the existing equatorial and altazimuth mounts. However, the objects of the present invention are not limited to the above-described object, and one or more other objects may be derived from the following description.

Technical Solutions

According to an aspect of the present invention, there is provided an observation apparatus for tracking and observing an observation target by rotating an observation unit, the observation apparatus including: a support unit having at least one side surface; and a rotation unit configured such that one end thereof is coupled to the support unit via a first axis rotation unit having a rotation axis perpendicular to the side surface, the other end thereof is coupled to the observation unit via a second axis rotation unit having a rotation axis perpendicular to the rotation axis of the first axis rotation unit, and the first axis rotation unit and the second axis rotation unit are disposed at different heights so that they do not intersect each other; wherein the observation unit is rotated clockwise or counterclockwise around a lateral direction by the first axis rotation unit, the vertical inclination of the observation unit is varied by the second axis rotation unit to perform omnidirectional observation, and the continuous tracking of an observation target is performed by the operation of the first axis rotation unit and the second axis rotation unit.

The rotation unit may include: a lateral rod coupled to the first axis rotation unit in a direction perpendicular to the side surface of the support unit; and a vertical rod coupled to the lateral rod in a direction intersecting a point of the lateral rod.

The rotation unit may further include a connection joint configured to be provided at a point where the lateral rod and the vertical rod intersect each other; and the connection joint may be fixedly coupled to the lateral rod and the vertical rod at a desired location so that the location at which the observation unit is fixed is varied, so that the point where the lateral rod and the vertical rod intersect each other is variable.

The lateral rod may be formed in the shape of a pair of lateral rods spaced apart from each other by a predetermined distance, and the pair of lateral rods may be coupled to one of both side surfaces of the first axis rotation unit, opposite to the vertical surface of the support unit, in parallel with a floor; and the vertical rod may be formed in the shape of a pair of vertical rods vertically coupled to the pair of lateral rods, respectively, to reduce the vibrations of the observation unit.

The support unit may include a plate-shaped base part, and a pair of body parts formed to be spaced apart from each other by a predetermined interval on the top of the base part; and the lateral rod of the rotation unit may be disposed between the pair of body parts in the state in which the first axis rotation unit is coupled to each end of the lateral rod so that the lateral rod is rotatably coupled to the support unit.

Advantageous Effects of the Invention

According to the present invention, the second axis rotation unit is disposed higher than the first axis rotation unit so that the second axis rotation unit by which the inclination angle of the observation unit is varied and the first axis rotation unit by which the rotation of the observation unit is varied clockwise or counterclockwise do not intersect each other. Accordingly, omnidirectional observation may be performed without a blind zone where it is difficult to perform observation, unlike in the conventional equatorial and altazimuth mounts. Furthermore, since there is no need for the rapid rotation of a mount in order to track a target passing through a blind zone, continuous tracking observation may be performed for targets ranging from low-speed objects to high-speed objects.

BRIEF DESCRIPTION OF THE DRAWINGS

FIG. 1 is a perspective view of an observation apparatus according to an embodiment of the present invention;

FIG. 2 is an assembly view of the observation apparatus shown in FIG. 1;

FIG. 3 is a diagram showing a state in which an observation unit is rotated when the first axis rotation unit of the observation apparatus shown in FIG. 1 is operated;

FIG. 4 is a diagram showing a state in which the observation unit is rotated when the second axis rotation unit of the observation apparatus shown in FIG. 1 is operated; and FIG. 5 is a perspective view of an observation apparatus according to another embodiment of the present invention.

DETAILED DESCRIPTION OF THE EMBODIMENTS

Embodiments of the present invention will be described in detail below with reference to the accompanying drawings. The embodiments to be described below have a rotational structure that enables omnidirectional observation because there is no blind zone where it is difficult to perform observation, unlike in the conventional equatorial and altazimuth mounts, and also enables the continuous tracking of both low-speed and high-speed observation targets. An observation apparatus capable of omnidirectional observation without a blind zone is briefly abbreviated as an "observation apparatus."

FIG. 1 is a perspective view of an observation apparatus according to an embodiment of the present invention, FIG. 2 is an assembly view of the observation apparatus shown in FIG. 1, FIG. 3 is a diagram showing a state in which an observation unit 10 is rotated when the first axis rotation unit 30 of the observation apparatus shown in FIG. 1 is operated; and FIG. 4 is a diagram showing a state in which the observation unit 10 is rotated when the second axis rotation unit 50 of the observation apparatus shown in FIG. 1 is operated. Referring to FIGS. 1 to 4, the observation apparatus according to the present embodiment includes the observation unit 10, a support unit 20, the first axis rotation unit 30, the second axis rotation unit 50, and a rotation unit 40.

The observation apparatus according to the present embodiment may be installed parallel to the ground, may be installed on the bottom surface of an airplane to observe a low-altitude flying object from a high altitude, or may be installed as a satellite payload in a direction facing the Earth for the purpose of real-time earth observation. Since the concept of height is meaningless in space, the fact that the second axis rotation unit is disposed higher than the first axis rotation unit means that the observation unit is arranged such that the field of view thereof is not limited by the first axis rotation unit.

The observation unit 10 is configured to receive observation data such as an image of light emitted or reflected by an observation target. The observation unit 10 is a term that collectively refers to components configured to detect optical data Depending on the type of optical data, the observation unit 10 may be a telescope barrel for receiving visible light, an antenna for receiving external radio waves, or a laser receiver for receiving laser beams transmitted from a satellite. Although for convenience of description, the observation unit 10 is simply illustrated as a cylindrical barrel, as shown in FIGS. 1 to 4, the observation unit 10 is not limited thereto. Accordingly, the observation unit 10 is generally shown based on a cylindrical barrel and a finder coupled to the periphery of the cylindrical barrel. In an actual implementation, a device for receiving observation data in the form of a separate electronic image signal may be further coupled to the observation unit 10.

The support unit 20 is a component to which the rotation unit 40 is rotatably coupled, and is configured to support the overall structure so that the observation unit 10 performs observation while being stably rotated. Accordingly, it is preferable that the support unit 20 is made of a material capable of minimizing vibration generated by the rotation of the rotation unit 40 or is firmly and fixedly installed on the ground or a separate structure such as a mobile vehicle, an airplane, or a satellite.

In detail, the support unit 20 includes a base part 21 and a body part 22. The overall outside shape of the support unit 20 shown in FIGS. 1 to 4 may be formed to have an "L"-shaped longitudinal section so that the support unit 20 is implemented in a form that minimizes vibration due to the rotational operation of the rotation unit 40 or the observation unit 10.

The base part 21 is coupled with the body part 22 to stably fix the overall structure. A representative example of the base part 21 may be a rectangular plate having a predetermined thickness, as shown in FIGS. 1 to 4, but is not necessarily limited thereto. The base part 21 may be fixedly installed on the floor of an observatory, the top of a tripod, or the like by a separate component such as an anchor or a bolt so that the observation apparatus can be stably supported. Alternatively, when necessary, the base part 21 may simply refer to the support surface of the body part 22. The body of a mobile vehicle, a trailer, an airplane, a satellite, or the like may be integrated with the base part 21.

The first axis rotation unit 30 is installed via the body part 22 so that the rotation unit 40 can be rotated clockwise or counterclockwise. The body part 22 shown in FIGS. 1 to 4 may be implemented as an example in a form in which the body part 22 is formed perpendicular to the top surface of the base part 21 and the first axis rotation unit 30 is installed through the vertical side of the body part 22. Alternatively, although not shown, the body part 22 and the base part 21 may be coupled by a hinge or a shaft so that they can maintain a coupled state at various angles, not necessarily at a right angle.

The body part 22 is preferably designed in such a manner that the interval between the portion of the body part 22, where the first axis rotation unit 30 is installed, and the upper end of the body part 22 is appropriately set such that the upper portion of the body part 22 does not obstruct the field of view of the observation unit 10. Furthermore, an electric motor 23 for rotating the first axis rotation unit 30 and a control circuit for controlling the electric motor 23 may be contained inside the body part 22.

The rotation unit 40 is a connection component in which one end thereof is coupled to the support unit 20 through the first axis rotation unit 30 having a rotation axis perpendicular to the side surface of the support unit 20 and the other end thereof is coupled to the observation unit 10 through the second axis rotation unit 50 having a rotation axis perpendicular to the rotation axis of the first axis rotation unit 30. In particular, the first axis rotation unit 30 and the second axis rotation unit 50 are disposed at different heights in the rotation unit 40 so that the first axis rotation unit 30 and the second axis rotation unit 50 do not intersect each other.

More specifically, the rotation unit 40 includes a lateral rod 41 coupled to the first axis rotation unit 30 in a direction perpendicular to the side surface of the support unit 20, and a vertical rod 42 formed in the direction intersecting the longitudinal direction of the lateral rod 41. The observation unit 10 is coupled to the upper portion of the vertical rod 42 so that the vertical inclination thereof can be varied via the second axis rotation unit 50. The rotation unit 40 shown in FIGS. 1 to 4 may have a reversed "L" shape, in which the lateral rod 41 and the vertical rod 42 are perpendicular to each other, as an example. The lateral rod 41 may be implemented as a single lateral rod, and the vertical rod 42 may be implemented as a single vertical rod. When necessary, the lateral rod 41 and the vertical rod 42 may be integrated with each other.

Alternatively, as shown in FIGS. 1 to 4, the lateral rod 41 may be formed in the shape of a pair of lateral rods spaced apart from each other by a predetermined interval, and the vertical rod 42 may be formed in the shape of a pair of vertical rods vertically coupled to the pair of lateral rods 41, respectively. When each of the lateral rod 41 and the vertical rod 42 is formed in the shape of a pair of rods as described above, vibrations generated during rotation are dispersed to minimize shaking.

A connection joint 43 is configured to be arranged at the intersection of the lateral rod 41 and the vertical rod 42 and to connect the lateral rod 41 and the vertical rod 42. The location of the connection joint 43 at which each of the lateral rod 41 and the vertical rod 42 is coupled is variable, so that the lateral location or vertical height of the observation unit 10 can be varied. Typically, the connection joint 43 may have a structure in which both the lateral rod 41 and the vertical rod 42 are passed through the connection joint 43 and fastened by bolts. Furthermore, the connection joint 43 may has a structure in which the part through which the lateral rod 41 passes and the part through which the vertical rod 42 passes are divided and rotated with respect to each other. In this case, the lateral rod 41 and the vertical rod 42 may maintain a coupled state at various angles with respect to each other.

The first axis rotation unit 30 is formed in the shape of a rectangular box through which a shaft is rotatably disposed, and the lateral rod 41 is coupled to one side of the first axis rotation unit 30. The first axis rotation unit 30 may be equipped with a rotating motor to enable electronic control. As shown in FIG. 3, when the first axis rotation unit 30 is rotated, the observation unit 10 is rotated clockwise or counterclockwise around a rotation axis parallel to a lateral direction.

The second axis rotation unit 50 is coupled to a side of the observation unit 10 so that the vertical inclination of the observation unit 10 is variable, and is rotated in the direction perpendicular to the rotation axis of the first axis rotation unit 30. The second axis rotation unit 50 may also be equipped with a rotation motor to enable electronic control like the first axis rotation unit 30. As shown in FIG. 4, when the second axis rotation unit 50 is rotated, the observation unit 10 is rotated up and down to vary the inclination thereof.

In particular, in the present embodiment, the first axis rotation unit 30 and the second axis rotation unit 50 are located at different heights, so that they enters a non-intersecting state, with the result that observation can be performed without a blind zone. In this case, the structure of being located at different heights signifies that the second axis rotation unit 50 is disposed higher than the first axis rotation unit 30 as in the embodiment shown in FIGS. 1 to 4 in order to allow the observation apparatus to be mounted on the ground or a mobile vehicle. Alternatively, the structure of being located at different heights signifies that the second axis rotation unit 50 is disposed lower than the first axis rotation unit 30 by inverting the embodiment shown in FIGS. 1 to 4 in order to allow the observation apparatus to be mounted on the bottom surface of an airplane or the rear surface of an artificial satellite for observing the ground.

In the present embodiment, the support unit 20 does not block the field of view of a lateral portion in that the present embodiment does not have a structure in which two rotation axes intersect each other, unlike in the conventional equatorial and altazimuth mounts, and observation may be performed at the celestial north or south pole or the zenith without a special blind zone. When the first axis rotation unit 50 and the second axis rotation unit 50 are simultaneously controlled, there are advantages in that observation targets ranging from low-speed space objects such as stars and galaxies in the celestial sphere to high-speed flying objects such as artificial satellites, missiles, and drones may be tracked and observed. A user may perform observation by arranging the present embodiment so that the line through which the rotation axis of the first axis rotation unit 50 connects the north and south poles of the celestial sphere at an observation point coincides with the line projected onto the ground surface, but the arrangement method is not necessarily limited thereto. Since continuous observation is made possible by controlling the first axis rotation unit 30 and the second axis rotation unit 50 simultaneously, there is an advantage in that there is no limitation in the direction in which the support unit 20 is installed.

In the case of the existing equatorial mount, when a telescope is oriented toward an area parallel to the main rotation axis (the right ascension axis), the rotation angle of the actually rotated mount is sharply increased in proportion to the tangent value compared to the angular distance on the celestial sphere. In order to track an object passing through the area, it may be necessary to momentarily rotate the mount by 180 degrees depending on the trajectory of the object, so that there is a limitation in that continuous tracking is not possible. When an altazimuth mount-type observation apparatus is oriented toward the zenith part parallel to the main rotational axis (azimuth axis) that rotates all 360 degrees, there is the same limitation in that the rotation angle of the actually rotated mount is sharply increased in proportion to the tangent value compared to the angular distance on the celestial sphere. In order to track an object passing through the zenith, there may be cases where the azimuth needs to be rotated by 180 degrees instantaneously, so that continuous tracking is not possible, as in the limitation of an equatorial mount-type observation apparatus.

The prior art literature, i.e., Korean Patent No. 10-1513199 entitled "Height Adjusting Device of Equatorial Mount for Astronomical Telescope" and Korean Patent No. 10-1513200 entitled "Worm Wheel Shaft Fixing Device of Equatorial Mount for Astronomical Telescope" disclose equatorial mounts. The prior art literature, i.e., Korean Patent No. 10-1069258 entitled "Mechanical Stopper Device of Altazimuth Mount for Large-Diameter Optical Telescope" discloses an altazimuth mount. The equatorial and altazimuth mount structures have problems in that it is difficult to observe the part (the celestial pole or the zenith) that a main rotational axis faces and continuous observation is impossible because the rapid rotation of a mount is required depending on the trajectory of an object passing through the main rotational axis. Accordingly, in order to continuously observe various objects ranging from low-speed observation targets such as a star, a galaxy, and a planet to high-speed objects such as an artificial satellite and a rocket, it can be seen that there is required a new type of mount structure rather than the existing equatorial and altazimuth mounts.

In this embodiment, the support unit 20 and the observation unit 10 are connected via the rotation unit 40 having the first axis rotation unit 30 and the second axis rotation unit 50 that do not intersect each other, so that there is no blind zone where observation is limited. There is no area where the first axis rotation unit 30 or the second axis rotation unit 50 needs to be rotated rapidly, so that the continuous tracking observation of objects ranging from low-speed objects to high-speed object is possible.

FIG. 5 is a perspective view of an observation apparatus according to another embodiment of the present invention. Referring to FIG. 5, the observation apparatus according to the present embodiment includes an observation unit 10, a support unit 20, first axis rotation units 30, a second axis rotation unit 50, and a rotation unit 40. In particular, since both ends of the rotation unit 40 are coupled to the support unit 20, the present embodiment has a stable and robust structure compared to the embodiment shown in FIGS. 1 to 4.

In the present embodiment, a pair of body parts 22 are formed on the top of a plate-shaped base part 21, and the rotation unit 40 is rotatably coupled between the pair of body parts 22. In detail, the rotation unit 40 includes at least one lateral rod 41 configured such that the ends thereof are rotatably coupled to the pair of body parts 22 via the first axis rotation units 30, and at least one vertical rod 42 vertically coupled to the lateral rod 41. In other words, the rotation unit 40 is formed in an inverted 'T' shape when viewed from a side, and is rotatably coupled to the body parts 22 via the first axis rotation units 30 at both ends of the lateral rod 41. Due to this structure, vibrations generated when the observation unit 10 is rotated may be reduced significantly.

In addition, although not shown in the drawings, a balancing means having a weight proportional to the mass of the observation unit 10 may be installed at a location below the rotation unit 40 opposite to the observation unit 10 in order to allow the observation unit 10 to be rotated stably, thereby enhancing weight balance. Appropriate weight compensation is required to rotate the observation device in places where gravity acts, such as Mars or the Moon, as well as the Earth. A representative example of the balancing means may be composed of a straight central rod and a weight through which the central rod passes. A user may variably install a weight along the central rod so that the observation unit 10 and the balancing means are balanced in terms of weight.

So far, the preferred embodiments of the present invention have been mainly described. It will be understood by those having ordinary skill in the art to which the present invention pertains that the present invention may be implemented in a modified form without departing from the essential features of the present invention. Therefore, the disclosed embodiments are to be taken into consideration in an illustrative sense rather than a limitative sense. The scope of the present invention is defined in the claims rather than the foregoing description, and all differences falling within a range equivalent thereto should be construed as being included in the present invention.

10 . . . Observation unit
20 . . . Support unit
21 . . . Base part
22 . . . Body part
23 . . . Electric motor
30 . . . First axis rotation unit
40 . . . Rotation unit
41 . . . Lateral rod
42 . . . Vertical rod
43 . . . Connection joint
50 . . . Second axis rotation unit

What is claimed is:

1. An observation apparatus for tracking and observing an observation target, the observation apparatus comprising:

a support unit having at least one side surface;
an observation unit having at least one side surface; and
a rotation unit including:
- a first end coupled to the support unit via a first axis rotation unit having a first rotation axis perpendicular to the at least one side surface, and
- a second end coupled to the observation unit via a second axis rotation unit having a second rotation axis perpendicular to the first rotation axis of the first axis rotation unit, wherein the first axis rotation unit and the second axis rotation unit are disposed at different heights so that they do not intersect each other, wherein the observation unit is configured to be rotated clockwise or counterclockwise around a lateral direction by the first axis rotation unit and to have a vertical inclination of the observation unit varied by the second axis rotation unit to perform omnidirectional observation, wherein the observation unit is configured to perform continuous tracking of an observation target by an operation of the first axis rotation unit and the second axis rotation unit, wherein the rotation unit comprises:
a lateral rod coupled to the first axis rotation unit in a first direction perpendicular to the at least one side surface of the support unit; and
a vertical rod coupled to the lateral rod in a second direction intersecting a point of the lateral rod, wherein the rotation unit further comprises a connection joint disposed at the point where the lateral rod and the vertical rod intersect each other, wherein the connection joint is coupled to the lateral rod and the vertical rod so that a location at which the observation unit is fixed is variable, and the point where the lateral rod and the vertical rod intersect each other is variable wherein the lateral rod comprises a pair of lateral rods spaced apart from each other by a first distance, the pair of lateral rods being coupled to a side surface of the first axis rotation unit, opposite to a vertical surface of the support unit, in parallel with a floor, and wherein the vertical rod comprises a pair of vertical rods coupled to the pair of lateral rods, respectively, the vertical rod being configured to reduce vibrations of the observation unit.

2. The observation apparatus of claim 1,
wherein the support unit comprises:
a plate-shaped base part; and
a pair of body parts spaced apart from each other by an interval on a top of the plate-shaped base part,
wherein the lateral rod of the rotation unit is disposed between the pair of body parts, and
wherein the first axis rotation unit is coupled to the lateral rod so that the lateral rod is rotatably coupled to the support unit.

* * * * *